United States Patent [19]

Gmeindl et al.

[11] Patent Number: 4,921,765
[45] Date of Patent: May 1, 1990

[54] COMBINED GOAL GASIFIER AND FUEL CELL SYSTEM AND METHOD

[75] Inventors: Frank D. Gmeindl, Morgantown, W. Va.; Rodney A. Geisbrecht, New Alexandria, Pa.

[73] Assignee: The United States of America as represented by the United States Department of Energy, Washington, D.C.

[21] Appl. No.: 371,144

[22] Filed: Jun. 26, 1989

[51] Int. Cl.$^5$ .............................................. H01M 8/06
[52] U.S. Cl. ........................................ 429/16; 429/17; 429/20
[58] Field of Search ........................ 429/16, 17, 19, 20, 429/26, 34

[56] References Cited

U.S. PATENT DOCUMENTS

| | | | |
|---|---|---|---|
| 4,128,700 | 12/1978 | Sederquist | 429/17 |
| 4,304,823 | 12/1981 | Lemelson | 429/19 |
| 4,622,275 | 11/1986 | Noguchi et al. | 429/19 |
| 4,738,903 | 4/1988 | Garow et al. | 429/19 X |
| 4,865,926 | 9/1989 | Levy et al. | 429/17 X |

OTHER PUBLICATIONS

Analysis of Fuel Cell and Competing Power Plant Designs for Utility Base-Load Applications, Argonne National Laboratory, Argonne, Ill., Nov. 1985.

Primary Examiner—Anthony Skapars
Attorney, Agent, or Firm—Stephen D. Hamel; William R. Moser; Richard E. Constant

[57] ABSTRACT

A molten carbonate fuel cell is combined with a catalytic coal or coal char gasifier for providing the reactant gases comprising hydrogen, carbon monoxide and carbon dioxide used in the operation of the fuel cell. These reactant gases are stripped of sulfur compounds and particulate material and are then separated in discrete gas streams for conveyance to appropriate electrodes in the fuel cell. The gasifier is arranged to receive the reaction products generated at the anode of the fuel cell by the electricity-producing electrochemical reaction therein. These reaction products from the anode are formed primarily of high temperature steam and carbon dioxide to provide the steam, the atmosphere and the heat necessary to endothermically pyrolyze the coal or char in the presence of a catalyst. The reaction products generated at the cathode are substantially formed of carbon dioxide which is used to heat air being admixed with the carbon dioxide stream from the gasifier for providing the oxygen required for the reaction in the fuel cell and for driving an expansion device for energy recovery. A portion of this carbon dioxide from the cathode may be recycled into the fuel cell with the air-carbon dioxide mixture.

22 Claims, 1 Drawing Sheet

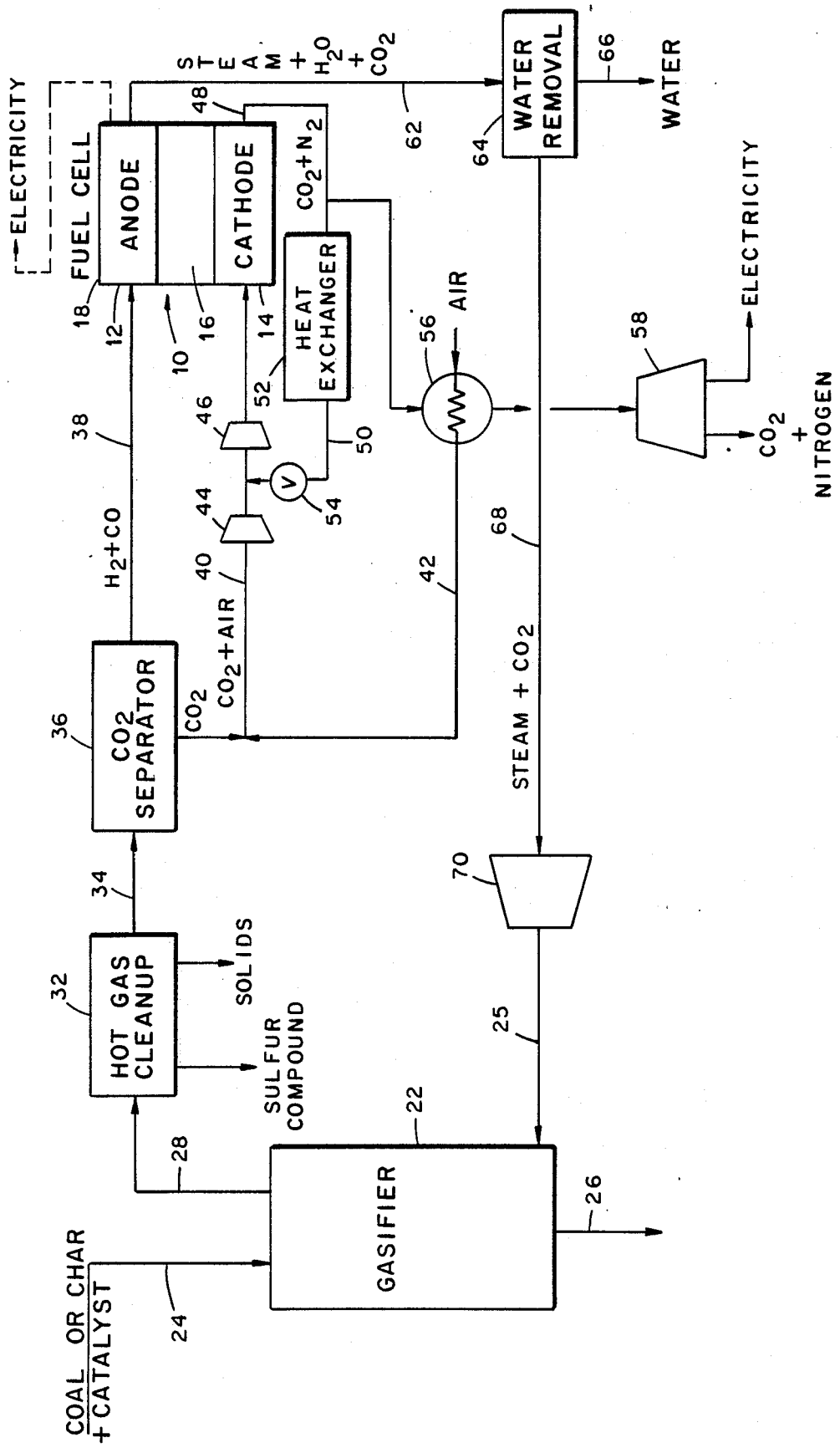

COMBINED GOAL GASIFIER AND FUEL CELL SYSTEM AND METHOD

BACKGROUND OF THE INVENTION

The present invention relates generally to the operation of a molten carbonate fuel cell with fuel gas derived from the gasification of coal, and more particularly to such an operation wherein steam and carbon dioxide in the reaction products generated at the anode in the fuel cell by the electricity-producing electrochemical reaction are utilized in a coal or coal char gasifier for endothermically reacting coal or char in the presence of a catalyst for providing the fuel gas.

The utilization of fuel cells in relatively large electrical power generating applications is becoming of increasing interest to the electrical industry. The principal reason for this increased interest is primarily due to recent advancements in fuel cell technology which have given strong indications that electrical power generation by using fuel cells can be achieved at rates which may be highly competitive with many existing electrical power producing technologies.

Of the various types of fuel cells being presently evaluated for possible commercial power production applications, molten carbonate fuel cells appear to be sufficiently developed to be considered a suitable candidate. As with all fuel cells, an electrochemical reaction is utilized in the molten carbonate fuel cell to convert the energy of the reaction of various chemicals directly into electrical energy. In a typical molten carbonate fuel cell there is an anode formed of a suitable material such as porous nickel which is separated from a cathode of a suitable material such as porous nickel oxide by an electrolyte formed of an alkali metal carbonate and mixtures thereof with a suitable material such as $LiAlO_2$. When the electrolyte is heated by any suitable means to a temperature sufficient to become liquified or in a molten state, the electrochemical reaction in a molten carbonate fuel cell can proceed by the simultaneous delivery of hot hydrogen to the anode and hot carbon dioxide and oxygen to the cathode. Normally, the electrochemical reaction can be effectively achieved in the molten carbonate fuel cell as presently available at a temperature in the range of about 1100° to about 1300° F. and at a pressure greater than atmospheric pressure and in the range of about 1.1 to about 6 atmospheres. The electrochemical reaction in the fuel cell is provided the reaction $H_2 + CO_3^= \rightarrow H_2O + CO_2 + 2e^-$ at the anode and the reaction $O_2 + 2CO_2 + 4e^- \rightarrow 2CO_3^=$ at the cathode. These reactions produce $H_2O$ at the anode while causing a transfer of $CO_2$ from the cathode to the anode with two Faradays of charge with each mole of $CO_2$. The reaction products generated during the electrochemical reaction in the molten carbonate fuel cell include the $H_2O$, primarily in the form of steam, and $CO_2$ at the anode. If air is used as the source of the oxygen for the reaction at the cathode some nitrogen will be mixed with the $CO_2$ in the stream of reactants at the cathode. While the efficiency of the electrochemical reaction for converting the reactant gases to electricity in a molten carbonate fuel cell is relatively high, i.e., in the order of about 80 percent, there is an incomplete conversion of all the reactant gases by the reaction. The energy in the reaction gases discharged from the fuel cell is primarily in the form of heat and must be recovered in order to provide the molten carbonate fuel cell with a level of efficiency which will make it commercially competitive with known electrical power producing systems. Any of several techniques may be utilized to recover the "waste" heat the reaction product gases discharged from the fuel cells. These techniques include the use of bottoming cycles which use boilers for the generation of steam for driving a steam turbine coupled to a generator or another suitable load.

Reactant gases used for the electrochemical reaction in a relatively large scale molten carbonate fuel cell system useful for commercial power production purposes may be provided by one of several techniques. For example, the placing of suitable hydrogen and carbon dioxide producing plants in close proximity to one or more fuel cell systems may be one approach for providing the necessary reactant gases. A more recent approach for supplying the reactant gases believed to be worthwhile for consideration is the utilization of a coal or coal char gasifier for producing fuel gas which contains the $H_2$ and $CO_2$ necessary for the electrochemical reaction in a molten carbonate fuel cell. In order to use the gaseous products from a coal gasifier in the fuel cell, essentially all of the particulate material greater than about sub-micron size and the sulfur-bearing compounds must be stripped from the fuel gas. After removing the solid particulate material and sulfur-bearing compounds from the gases the $CO_2$ and the $H_2$ must be separated from one another for delivery to the appropriate fuel-cell electrodes. While there are several presently known techniques for removing sulfur-bearing compounds and particulate material from the stream of product gases from a gasifier and for separating hydrogen from carbon dioxide, these techniques must be capable providing these functions without excessively reducing the temperature of the gases to a level less than that required for effecting the electrochemical reaction in the fuel cell and maintaining the electrolyte in a liquid state. A discussion pertaining to the use of fuel gas from a gasifier in as the fuel gas for a molten carbonate fuel cell is set forth in a report entitled, "Analysis of Fuel Cell and Competing Power Plant Designs for Utility Base-Load Applications", Argonne National Laboratory, November 1985. This report is incorporated herein by reference.

SUMMARY OF INVENTION

The primary aim or objective or present invention is to provide a molten carbonate fuel cell system in which a coal or char gasifier is utilized in combination with the fuel cell for providing the reactant gases required for the electricity-producing electrochemical reaction in the fuel cell. In accordance with the present invention, the fuel cell and the gasifier are arranged in a novel combination wherein the steam and carbon dioxide generated by the electrochemical reaction at the anode in the fuel cell are utilized in a catalytic coal or coal char gasifier for providing the steam, reducing atmosphere and the heat utilized in the endothermic reaction therein for providing the fuel gases used in the fuel cell reaction. The coal gasification and fuel cell system of the present invention comprises in combination, a coal gasification means for endothermically reacting coal or coal char in the presence of a catalyst and steam in a reducing or oxygen-free atmosphere for producing a gaseous product stream primarily containing carbon monoxide, carbon dioxide and hydrogen. The gasification means are coupled by conduit means to anode means and cathode means of a molten carbon fuel cell means. Gas separating means are disposed along the conduit means for receiving the gaseous product stream and separating the carbon dioxide from the hydrogen. The portion of the conduit means between the gas separating means and the fuel cell means comprise first and second conduit means. The first conduit means are used for conveying hydrogen separated in the gas separating means to the anode means and while the second conduit means are for conveying carbon dioxide separated in the gas separating means to the cathode means. The carbon dioxide and hydrogen introduced into the fuel cell means by the conduit means effect an electrochemical reaction in the fuel cell means for producing an electrical output while generating reaction products including steam at the anode means. Further conduit means couple the anode means to the gasification means for conveying steam generated in the fuel cell means to the gasification means for providing steam and heat utilized for the endothermic reaction in the gasification means. In addition to the steam generated at the anode means in the fuel cell means, a significant volume of carbon dioxide is also generated at the anode means by the electrochemical reaction. This carbon dioxide gas is conveyed along with the steam to the coal gasification means for providing heat and the reducing or oxygen-free atmosphere utilized in the gasification means for the endothermic reaction. The coal or char gasification means provides a gaseous product stream containing carbon dioxide and hydrogen at a temperature in the range of about 1100° F. to about 1300° F. and a pressure in the range of above one atmosphere to about six atmospheres. The gasifier is preferably operated at a pressure corresponding to the pressure in the fuel cell. When the product gases are maintained at essentially these temperatures and pressures the gases can be introduced into the fuel cell without further heating or pressurization. However, in the event the temperature or the pressure of the product gases are excessively reduced in the gas clean-up operation or the gas separating operation the gasification means can be operated at a higher temperature or pressure to overcome the reductions. Preferably, the losses in temperature and/or pressure in product gases is held to a minimum in order to maintain a high level of efficiency for the overall system. The temperature of the reaction gases discharged from the fuel cell means are higher by as much as about 250° to about 275° F. than the temperature of the reactant gases introduced into the fuel cell means due to the heat generated during the electrochemical reaction in the fuel cell means.

One of the principal products of the electrochemical reaction in the fuel cell means is water at the anode means which is in the form of saturated steam and free water at the pressures and temperatures employed in the operation of the fuel cell means. The CO in the gaseous products are preferably conveyed to the anode means where the CO reacts with the water in the presence of steam to form $H_2$ and $CO_2$. In order to assure that the quantity of water used in the gasification means in the form of steam and present in the product gases discharged from the gasification means is maintained at a level wherein satisfactory operation of the achieved, the excess water must be removed from the discharge stream of reaction gases before the gases are introduced into the gasification means.

The stream of reaction products generated at the cathode means by the electrochemical reaction contains carbon dioxide, a portion of which may be recycled into the fuel cell means along with the carbon dioxide in the above mentioned second conduit means to assure and maintain the concentration of the carbon dioxide an acceptable level at the cathode means. The temperature of this makeup gas stream can be readily regulated and controlled by cooling or heating to assure that the reaction temperature at the cathode means is maintained at a satisfactory value.

The oxygen utilized in the electrochemical reaction at the cathode means in the fuel cell means is preferably provided by mixing air with the stream of carbon dioxide discharged from the gas separating means. The volume of air mixed with the carbon dioxide must be sufficient to provide the oxygen requirements for the reaction at the cathode means as described above. This stream of air is preferably passed in heat exchange relationship with the hot stream of carbon dioxide being discharged from the fuel cell before it is admixed with the stream of carbon dioxide to selectively heat and maintain the air-carbon dioxide mixture at a temperature desired for the operation of the fuel cell means. With air being used as the source for the oxygen used in the electrochemical reaction, the stream of reaction gases discharged at the cathode means will also include some nitrogen. The presence of nitrogen in the fuel cell at relatively low concentrations is not harmful. However, if the concentration of nitrogen in the fuel cell means tends to become excessive, the nitrogen can be separated from the makeup stream of carbon dioxide by using a ceramic membrane such as in the gas separating means. The major portion of the reaction gases discharged at the cathode means are utilized in the heat exchanger for the air and are then passed through a suitable power generation system such as a turbine or the like for the recovery of heat energy remaining in the gas stream.

The hydrogen and or the carbon dioxide-air mixture may require pressurization in order to be introduced into the fuel cell means at a selected pressure within the aforementioned operating range. Also, the stream of steam and carbon dioxide conveyed from the fuel cell means to the gasification means is pressurized to provide the catalytic gasification a the pressure necessary for operating the fuel cell means.

Other and further objects of the invention will be obvious upon an understanding of the illustrative embodiments and method about to be described or will be indicated in the appended claims, and various advantages not referred to herein will occur to one skilled in the art upon employment of the invention in practice.

DESCRIPTION OF THE DRAWINGS

The single figure is a schematic diagram illustrating as a flowsheet details of the gasifier-molten carbonate fuel cell combination of the present invention wherein reaction products being discharged from the fuel cell are utilized in the coal or char gasifier to endothermically gasify the coal or char with steam in the presence of a catalyst in an oxygen-free atmosphere for producing the fuel gas utilized in the operation of the fuel cell. While a single fuel cell is illustrated it will appear clear that any number of fuel cells in stacks or in any other arrangement can be utilized in the combination of the present invention.

The arrangement of the invention shown in the drawing has been chosen for the purpose of illustration and description. This embodiment of the invention illustrated is not intended to be exhaustive or to limit the invention to the precise form disclosed. It is chosen and described in order to best explain the principles of the invention and their application in practical use could thereby enable other skill of the art could best utilize the invention in various embodiments and modifications as are best adapted to the particular use contemplated.

DETAILED DESCRIPTION OF THE INVENTION

With reference to the accompanying drawing the molten carbonate fuel cell and gasifier combination of the present invention is an arrangement capable of operating in a more efficient manner than previously known fuel cell-gasifier arrangements. In the drawing a conventional molten carbonate fuel cell is generally shown at 10 and comprises an anode 12 and a cathode 14 with a body of electrolyte 16 therebetween. The anode 12 may be formed of any suitable commercially available material such as porous nickel. The cathode 14 may also be formed of a suitable available material such as nickel oxide. The electrolyte 16 may be of any suitable material such as an alkali metal compound and lithium aluminate. The anode, cathode and electrolyte are normally maintained in a housing such as generally shown at 18. The molten carbonate fuel cells are well known for their operation at temperatures of about 1050° to 1150° F. and at pressures in the range of about 1.1 to about 6 atmospheres. The fuel cell as generally mentioned above generates electricity by an electrochemical reaction wherein hydrogen, carbon dioxide and oxygen are the reacting gases. These gases are introduced into the fuel cell at the appropriate electrodes such as the hydrogen at the anode 12 and carbon dioxide and oxygen at the cathode 14 for enabling the above described electrochemical reaction to occur for effecting the production of electrical power.

A coal or coal char gasifier utilized to provide the electrodes 12 and 14 of the fuel cell 10 with the reactant hydrogen and carbon dioxide gases is generally shown at 22. This gasifier 22 is a catalytic-type reactor wherein an endothermic reaction is achieved in an essentially oxygen-free or reducing atmosphere with coal or char in the presence of a catalyst, steam and external source of heat. The endothermic reaction pyrolyzes essentially all of the coal or char to provide a stream of product gases which are rich in hydrogen, carbon dioxide and carbon monoxide and contain lesser quantities of impurities such as hydrogen sulfide and carbonyl sulfide. As shown, the coal or char, in particulate form, is introduced into the gasifier 28 through line 24. The catalyst may be of any suitable type such as potassium/calcium oxides or potassium/nickel oxides with or without pyrites and may be combined with the coal or char prior to the introduction thereof into the gasifier 22. Alternatively, the catalyst may be introduced into the gasifier 22 through a separate line (not shown). It may be also desirable to introduce into the gasifier 22 a calcium compound such as CaO or $CaCO_3$ to provide adsorption of the sulfur as well as some additional catalytic activity during the gasification operation. The endothermic reaction within the gasifier 22 is achieved by introducing the coal or coal char and a catalyst such as mentioned above into the gasifier 22 while introducing a stream of steam and carbon dioxide through a separate feed line 25, as will be discussed in detail below. This stream of steam and carbon dioxide provides the high-temperature heat source, the steam and the reducing atmosphere necessary to effect the endothermic reaction of the coal or char in the gasifier 22. The solid reaction products including spent catalyst resulting from the endothermic reaction are discharged from the gasifier 22 through line 26 at the base of the gasifier 22. The gaseous reaction products are discharged from the gasifier 22 through a line or conduit 28 at the top of the gasifier 22 with these gaseous products preferably being at a temperature in the range of about 1050° to about 1150° F. The gasifier 22 is preferably operated at a pressure greater than atmospheric and in a range of about 1.1 to about 6 atmospheres. These ranges of temperature and pressure correspond to those at which the molten carbonate fuel cell will satisfactorily operate. However, if some reduction in the temperature or pressure is experienced in the gaseous product stream between the gasifier 22 and the fuel cell 10 such as caused the treatment of the gaseous products for the removal of solid particulates and sulfur and/or the separation of the reactant gases for use in appropriate electrodes in the fuel cell 10, then the gasifier 22 can be operated at higher temperatures and/or pressures to satisfy the requirements of the fuel cell.

The conduit 28 conveys the stream of fuel gas or gaseous reaction products from the gasifier 22 into a hot gas cleanup system generally shown at 32 wherein essentially all solid particulates and sulfur compounds are removed from the gas stream prior to the separation of the hydrogen and carbon dioxide from the gaseous stream for introduction into the fuel cell 10 at appropriate electrodes. The removal of essentially all the sulfur from the product gas stream is necessary since sulfur concentrations greater than about 1-5 ppm have been found to be detrimental to the operation of the fuel cell. The removal of the sulfur compounds is preferably achieved in any suitable manner while maintaining the gaseous product stream in the aforementioned temperature and pressure range. For example, a bed of zinc ferrite or other solid adsorbent may be used to remove sulfur compounds from the gaseous product stream.

Essentially all of the solid particulate matter in the product gases must also be removed from the reactant gases used in the fuel cell 10. It has been found that sufficient particulate material must be removed to provide the gaseous stream with a maximum amount of particulate material of less than about one milligram per liter of gas with this particulate materials being of a size less than about 10 micrometers. The apparatus expected to provide satisfactory removal of particulate material from hot gas streams, preferably without excessively decreasing the temperature or pressure of the gaseous products include cyclones, ceramic filters, and the like.

The product gases once stripped of the sulfur and particulate material are then conveyed via conduit 34 to a gas separating apparatus generally shown at 36 which is required for separating the carbon dioxide from the hydrogen in the product gases for separate conveyance to appropriate electrodes in the fuel cell 10. The separation of the carbon dioxide from the hydrogen in the product gas stream should be achieved in a manner with little or no losses in temperature or pressure in both of the separated gas streams even though some pressure reductions may be experienced in one of the separated gas streams. For example, ceramic membranes formed of a material such as aluminum oxide have been found to be useful for separating $CO_2$ from $H_2$ and other lighter gases such as CO in the gaseous products. These ceramic membranes are selectively porous to $CO_2$ to provide for the separation of the $CO_2$ from essentially all the other gases present in the gaseous products. However, by using such membranes the pressure of the separated stream of $CO_2$ is reduced to or essentially to atmospheric pressure as it is separated in the membrane. The pressure of the $CO_2$ must be increased to a selected pressure in the operating range before it can be introduced into the fuel cell 10. The stream of $CO_2$ is conveyed from the separator 36 through a separate line 40 to the cathode 14 of the fuel cell 10.

In accordance with the present invention, a stream of air in line 42 is combined with the $CO_2$ in line 40 in a sufficient concentration to provide the oxygen necessary for effecting the portion of the electrochemical reaction at the cathode 14. Inasmuch as the $CO_2$ stream may undergo a pressure loss to or about to atmospheric pressure in the separator 36 the air stream in conduit 42 may be admixed with the stream of $CO_2$ without being pressurized. However, if the pressure in the stream of $CO_2$ from the separator 36 is not at or near atmospheric pressure, a simple compressor (not shown) may be employed to pressurize the air stream to a value corresponding to that of the $CO_2$. In the embodiment illustrated in the drawing, the stream of $CO_2$ from the separator 36 is reduced to atmospheric pressure and is mixed with air at the same pressure. This mixture of $CO_2$ and air is pressurized in a suitable compressor such as shown at 44 to a pressure slightly less than that desired for use in the operation of the fuel cell 10. This pressurized mixture is conveyed into a further compressor 46 connected in conduit 40 downstream of compressor 44 for boosting the pressure of the mixed gas stream to the pressure desired for use in the fuel cell 10. The utilization of this two-stage compressor arrangement is advantageous for the introduction of additional $CO_2$ into line 40 when the concentration of $CO_2$ from the separator 36 is insufficient to provide the desired electrochemical reaction in the fuel cell. In such an instance a portion of the $CO_2$ generated by the reaction at the cathode 14 of the fuel cell 10 and discharged from the fuel cell 10 through line 48 may be admixed with the $CO_2$-air mixture at a location between the compressors 44 and 46 for recycling purposes in order to provide the fuel cell with appropriate concentration of $CO_2$. By introducing the recycled $CO_2$ via conduit 50 into conduit 40 at a location between the compressors the discharge pressure from the first compressor 44 can be adjusted so as to correspond with the pressure of the recycled $CO_2$ in line 50. Another advantage to the utilization of this $CO_2$ recycling arrangement is that a suitable heat exchanger generally shown at 52 may be placed in line 50 to regulate the temperature of the $CO_2$-air mixture being conveyed into the fuel cell. For example, the heat exchanger 52 may be used to cool or heat the $CO_2$-air mixture to assure that the operating temperature of the fuel cell 10 is maintained within the desired range. A suitable valve 54 is shown in line 50 for regulating the flow of the makeup $CO_2$ into line 40.

While the drawing and the above description is directed to an embodiment wherein the $CO_2$ is separated from the $H_2$, it will appear clear that a gas separating mechanism which is capable of preferentially separating the $H_2$ from the other gaseous constituents in the product gases may be readily utilized in place of the $CO_2$ separating mechanism 36. The preferential separation of $H_2$ may be achieved by membranes, electrochemical means, hollow fibers of alunina or silica, or prsssure swing adsorption. If a pressure drop occurs in the separated stream of $H_2$ due to the separation process, a suitable compressor (not shown) may be placed in the line 28 to pressurize the $H_2$ to the appropriate pressure for fuel cell use. Also, in such a separation the stream of $CO_2$ may be at or near the desired pressure for use in the fuel cell. In such an event, the air stream to be mixed with the $CO_2$ may be pressurized to a pressure corresponding to that of the $CO_2$ stream by placing a compressor in the air conduit. If further pressurization of the mixture, with or without the makeup $CO_2$, a two-stage compressor arrangement such as shown in the drawing may be used.

The embodiment shown in the drawing is the preferred embodiment with respect to the separation of the reactant gases in that the CO in the gaseous products remains with the $H_2$ and is conveyed into the fuel cell at the anode 12 where the water-gas reaction ($H_2O + CO \rightleftharpoons H_2 + CO_2$) takes place in the presence of steam without the expenditure of energy to increase the concentration of reactant gases for the fuel cell 10 and the gasifier 22. In the event the $H_2$ is preferentially separated the CO must be then separated from the $CO_2$ in any suitable manner such as with a ceramic membrane and combined with the $H_2$ feed to the anode 12.

The carbon dioxide stream discharged from the cathode 14 through line 48 may also be used to heat the stream of air in line 42 prior to being mixed with the $CO_2$ in line 40. To accomplish this heating step a suitable heat exchanger with appropriate controls as generally shown at 56, may be utilized in lines 42 and 48. The air stream thus heated by the $CO_2$ stream in line 48 assures that the $CO_2$-air mixture conveyed into the cathode 14 is at the desired temperature. The heat energy remaining in the carbon dioxide after passing through the heat exchanger 56 may be extracted in a suitable turbine as generally shown at 58 and which can be coupled to a power generator for the purpose of generating electricity for further increasing the overall efficiency of the fuel cell system. The gas stream discharged through line 48 from the cathode will contain nitrogen primarily derived from the air in the air-$CO_2$ mixture being conveyed to the cathode through line 40. The concentration of the nitrogen is usually insufficient to detract from the operation of the fuel cell when recycled with the makeup $CO_2$.

The electrochemical reaction in the fuel cell 10 generates reaction products at the anode 12 that are formed primarily of water as steam and $CO_2$. In accordance with a primary feature of the present invention these reaction products from the anode 12 are introduced into the gasifier 22 to provide the heat, steam and reducing atmosphere necessary to effect the reactant gas-producing endothermic reaction with coal or char in the presence of a catalyst. This stream of reaction products from the anode 12, like the stream of reaction products from the cathode 14, is at a temperature higher than that of the reactant gases entering the electrodes 12 and 14 of the fuel cell 10. The temperature of the reaction gases from the fuel cell 10 is in the range of about 1300° to about 1375° F., which is about 250° to 275° F. hotter than the reactant gases entering the fuel cell 10. Before the stream of reaction gases from the anode 12 of the fuel cell are introduced in the gasifier 22 through conduit 62 they are first conveyed into a suitable water removal system 64 such as a condenser, drying bed or the recycle of purge stream from anod effluent through a catalytic combustor to the cathode and out through a bottoming cycle through line 58. In the water removal system 64 excess water in the steam is removed and discharged through line 66. The quantity of excess water that has to be removed from the reaction products from the anode 12 depends upon several factors such as the volume of steam needed to efficiently effect the endothermic reaction in the gasifier 22 and the volume of steam needed for the operation of the fuel cell. Normally, the electrochemical reaction in the fuel cell generates more water than required to the endothermic reaction in the gasifier 22. This excess water is removed from the system through the water extracting mechanism 64. The steam and $CO_2$, which is preferably maintained at a temperature in the range of about 1300° to 1375° F. during this water removal process, is conveyed through line 68 to a suitable compressor 70 where the steam and carbon dioxide are pressurized to a pressure corresponding to that desired for use in the gasifier 22 and the fuel cell 10. As pointed out above the gasifier 22 may be operated at a higher pressure than that utilized in the operation of the fuel cell to assure that any pressures losses in the reactant gas clean up and gas separating mechanisms are adequately compensated for. This pressurized charge of steam and carbon dioxide is then conveyed into the gasifier through line 25 to provide and support the endothermic reaction with the coal or char in the presence of a catalyst. This compressors 70 as well as the compressors 44 and 46 may be coupled to turbines driven by a portion of the $CO_2$ being discharged from the cathode 14 through line 48.

It will be seen that the present invention provides a novel combination of a gasifier with a molten carbonate fuel cell wherein the overall efficiency of the fuel cell is greatly enhanced since the source of reactant gases provided to the fuel cell are produced in a gasifier which, in turn, is provided with the reaction gases from anode of the fuel cell to provide the steam, the reducing atmosphere and the heat needed in the gasifier to support and effect a reactant gas-producing endothermic reaction with coal or char in the presence of a catalyst.

We claim:

1. A coal gasification and fuel cell system, comprising in combination coal gasification means for endothermically reacting coal or coal char in the presence of a catalyst, an external source of heat and steam for producing a stream of gaseous products containing carbon dioxide and hydrogen at a temperature in the range of about 1150° to 1050° F., a molten carbonate fuel cell means having anode means and cathode means, conduit means connecting the gasification means to the fuel cell means, gas separating means in said conduit means for separating the carbon dioxide from the hydrogen, said conduit means comprising a first conduit means coupling said gas separating means and said anode means for conveying hydrogen separated in said gas separating means to said anode means and second conduit means coupling said gas separating means and said cathode means for conveying carbon dioxide separated in said gas separating means to said cathode means with said carbon dioxide and hydrogen effecting an electrochemical reaction in said fuel cell for producing an electrical output while generating steam at said anode means, and further conduit means coupling said anode means to said gasification means for conveying the steam produced in the fuel cell means to said gasification means for providing heat and the steam utilized for said endothermic reaction.

2. A coal gasification and fuel cell system as claimed in claim 1, wherein said further conduit means convey carbon dioxide generated at said anode to said gasification means for providing a reducing atmosphere in said gasification means for said endothermic reaction.

3. A coal gasification and fuel cell system as claimed in claim 2, wherein water separating means are disposed in said further conduit means for removing excess water from the steam generated at the anode means.

4. A coal gasification and fuel cell system as claimed in claim 2, wherein particulate separating means are disposed in said conduit means at a location between said gas separating means and said gasification means for removing solid particulates from the stream of gaseous products.

5. A coal gasification and fuel cell system as claimed in claim 2, wherein means are disposed in said conduit means at a location between said gas separating means and said gasification means for removing sulfur-bearing compounds from the stream of gaseous products.

6. A coal gasification and fuel cell system as claimed in claim 2, wherein the electrochemical reaction in said fuel cell means is provided at a pressure in the range of greater than atmospheric to about six atmospheres, wherein compressor means are disposed in said further conduit means at a location between said water separating means and said gasifier for compressing the steam and carbon dioxide conveyed into said gasification means from said further conduit means to effect the endothermic reaction in the gasification means at a pressure adequate to provide the stream of gaseous products with a pressure sufficient to provide at least one of the hydrogen and the carbon dioxide conveyed into said fuel cell means with a pressure corresponding to a pressure in said range.

7. A coal gasification and fuel cell system as claimed in claim 6, wherein one of the hydrogen or carbon dioxide being conveyed from said gas separating means to said fuel cell means is at a pressure lower than the pressure of the other one of the hydrogen or carbon dioxide which corresponds to the pressure of said at least one of the hydrogen of carbon dioxide conveyed into said fuel cell means, and wherein further compressor means are coupled in the first or second conduit means conveying said one of the hydrogen or carbon dioxide at the lower pressure to a pressure essentially corresponding to the pressure of said other one of the hydrogen or carbon dioxide.

8. A coal gasification and fuel cell system as claimed in claim 6, wherein still further conduit means are coupled to said second conduit means for conveying air into the second conduit means to provide a mixture of air and carbon dioxide therein, wherein compressor means are adapted to pressurize said mixture to a pressure corresponding to a pressure in said range.

9. A coal gasification and fuel cell system as claimed in claim 8, wherein another conduit means is coupled to the cathode means for conveying carbon dioxide from the cathode means wherein heat exchange means are in registry with said another conduit means, and wherein said still further conduit means are in registry with said heat exchange means for heating the air therein.

10. A coal gasification and fuel cell system as claimed in claim 9, wherein still another conduit means is coupled to said second conduit means and said another conduit means for conveying an adequate quantity of carbon dioxide from said cathode into said mixture of air and carbon dioxide to provide the cathode with sufficient carbon dioxide to effect the electrochemical reaction in the fuel cell means.

11. A coal gasification and fuel cell means as claimed in claim 10, wherein heat exchange means are in registry with said still another conduit means for providing the carbon dioxide therein with a temperature sufficient to effect the electrochemical reaction within the fuel cell at a temperature within said range of about 1050° to 1150° F.

12. A method for operating a molten carbonate fuel cell with fuel gas from a coal gasifier, comprising the steps of generating a stream of gaseous products containing hydrogen and carbon dioxide at a temperature in the range of about 1050° to 1150° F. by endothermically reacting coal or char in the presence of a catalyst and steam in a reducing atmosphere, removing particulate material and sulfur-bearing material from the stream of gaseous products, separating the hydrogen from the carbon dioxide, conveying a stream of the separated carbon dioxide to a cathode of the molten carbonate fuel cell and a stream of the separated hydrogen to an anode of the molten carbonate fuel cell for effecting an electrochemical reaction in the molten carbonate fuel cell for producing electricity while generating reaction products comprising steam at the anode at a temperature greater than the temperature of the stream of gaseous products, and conveying a stream of the reaction products into the coal gasifier for providing the steam and heat required for effecting the endothermic reaction in the coal gasifier.

13. The method for operating a molten carbonate fuel cell with fuel gas from a coal gasifier as claimed in claim 12, wherein the stream of reaction products generated at the anode includes carbon dioxide, and wherein the step of conveying the stream of reaction products generated at the anode into the coal gasifier includes conveying carbon dioxide therein into the coal gasifier for providing the reducing atmosphere and heat in the coal gasifier required for effecting the endothermic reaction.

14. The method for operating a molten carbonate fuel cell with fuel gas from a coal gasifier as claimed in claim 13, wherein the streams of hydrogen and carbon dioxide are pressurized to a pressure adequate to provide the molten carbonate fuel cell with an operating pressure in the range of above atmospheric pressure to about six atmospheres, and includes the additional step of pressurizing the stream of reaction products generated at the anode to a pressure sufficient to provide at least one of the streams of hydrogen or carbon dioxide with a pressure in said range prior to the introduction of the stream of reaction products into the coal gasifier.

15. The method for operating a molten carbonate fuel cell with fuel gas from a coal gasifier as claimed in claim 14, wherein the reaction products generated at the anode include water, and including the additional step of removing water from the stream of reaction products prior to the introduction thereof into the coal gasifier.

16. The method for operating a molten carbonate fuel cell with fuel gas from a coal gasifier as claimed in claim 15, wherein sufficient water is removed from the stream of reaction products from the anode to provide the quantity of steam in the coal gasifier adequate to maintain the endothermic reaction in the coal gasifier for the gaseous products with sufficient concentrations of hydrogen and carbon dioxide for effecting the electrochemical reaction in the molten carbonate fuel cell.

17. The method for operating a molten carbonate fuel cell with fuel gas from a coal gasifier as claimed in claim 15, including the additional step of mixing a stream of air with the stream of carbon dioxide with said air being at a sufficient volume to provide adequate oxygen at the cathode for the electrochemical reaction.

18. The method for operating a molten carbonate fuel cell with fuel gas from a coal gasifier as claimed in claim 17, wherein the electrochemical reaction generates a stream of reaction products at the cathode containing carbon dioxide, and including the additional step of conveying the stream of reaction products from the cathode in heat exchange relationship with the stream of air before the mixing thereof with the stream of carbon dioxide from the gas separating means for heating the air to a temperature adequate to provide the mixture of air and carbon dioxide with a temperature within said range.

19. The method for operating a molten carbonate fuel cell with fuel gas from a coal gasifier as claimed in claim 18, including the additional step of admixing an adequate portion of the carbon dioxide in the stream of reaction products from the cathode with the mixture of air and carbon dioxide to provide the cathode with the volume of carbon dioxide required for the electrochemical reaction.

20. The method for operating a molten carbonate fuel cell with fuel gas from a coal gasifier as claimed in claim 19, including a further step of regulating the temperature of said portion of the carbon dioxide prior to the admixture thereof with the mixture of air and carbon dioxide to maintain the temperature at which the electrochemical reaction occurs within said range.

21. The method for operating a molten carbonate fuel cell with fuel gas from a molten carbonate fuel cell as claimed in claim 20, including a still further step of pressurizing said admixture of air and carbon dioxide to a pressure in said range.

22. The method for operating a molten carbonate fuel cell with fuel gas from a coal gasifier as claimed in claim 20, wherein the step of separating the hydrogen from the carbon dioxide reduces the pressure of the carbon dioxide in the separated stream to substantially atmospheric pressure, and including the step of mixing the stream of air with the stream of carbon dioxide separated from the hydrogen prior to pressurizing the mixture to a pressure in said range.

* * * * *